United States Patent [19]
Lord et al.

[11] Patent Number: 6,108,447
[45] Date of Patent: Aug. 22, 2000

[54] METHOD AND APPARATUS FOR ESTIMATING FRAME RATE FOR DATA RATE CONTROL

[75] Inventors: Christopher Lord; Jeffrey S. McVeigh, both of Portland, Oreg.

[73] Assignee: Intel Corporation, Santa Clara, Calif.

[21] Appl. No.: 09/049,287

[22] Filed: Mar. 26, 1998

[51] Int. Cl.[7] .................................................. G06K 9/36
[52] U.S. Cl. ........................ 382/232; 382/235; 345/420; 348/405
[58] Field of Search .................................. 382/232, 235, 382/244; 370/280; 379/202; 345/420; 348/405

[56] References Cited

U.S. PATENT DOCUMENTS

| | | | |
|---|---|---|---|
| 5,434,913 | 7/1995 | Tung et al. ............................. | 379/202 |
| 5,568,483 | 10/1996 | Padovani et al. ........................ | 370/84 |
| 5,923,648 | 7/1999 | Dutta ..................................... | 370/280 |
| 5,959,631 | 9/1999 | Knittel .................................. | 345/420 |
| 6,023,296 | 2/2000 | Lee et al. .............................. | 348/405 |

*Primary Examiner*—Jose L. Couso
*Assistant Examiner*—Anh Hong Do
*Attorney, Agent, or Firm*—Blakely, Sokoloff, Taylor & Zafman LLP

[57] ABSTRACT

A method for managing data in a video sequence includes estimating a frame rate of the video sequence using time stamps of instructions received from an application program interface. A number of bits is allocated for encoding frames in the video sequence according to a data rate and the frame rate.

22 Claims, 6 Drawing Sheets

METHOD AND APPARATUS FOR ESTIMATING FRAME RATE FOR DATA RATE CONTROL

FIELD OF THE INVENTION

The present invention relates to the field of video encoding. More specifically, the present invention relates to a method and apparatus for estimating frame rate for data rate control.

BACKGROUND OF THE INVENTION

The growth in personal computer (PC) usage and connectivity has forged new and creative ways for individuals and businesses to communicate and share information. Among these new methods include those which add video sequences to traditional methods of communication. Adding video sequences allow individuals and businesses to participate in activities such as video conferencing, video mail, interactive document editing, and object display.

Video sequences often contain large amounts of information. In order to transmit video sequences over bandlimited channels such as the Public Switched Telephone Network (PSTN), local area networks (LANs), the Internet, broadcast, and mobile networks, data rate control is required for encoding the video sequences. Data rate control may also be needed for encoding the video sequences for transmission over non-band-limited channels. Recording mediums such as hard drives, compact disk read only memory (CD-ROM) drives, and digital video disk (DVD) drives have storage constraints that need to be satisfied.

A necessary parameter in the process of data rate control is the frame rate of the video sequence. In real-time environments, the exact frame rate is often non-deterministic. An example of this uncertainty in the frame rate is observed when fluctuations in system load on a computer system may temporarily increase or decrease the video capture frame rate. Many application program interfaces (APIs) such as Microsoft's Video for Windows® API fail to report the frame rate to installed video encoders during real-time capture and compression.

SUMMARY

A method for managing data in a video sequence is disclosed. A frame rate of the video sequence is estimated using time stamps of instructions received from an application program interface. A number of bits for encoding frames in the video sequence is allocated according to a data rate and the frame rate.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
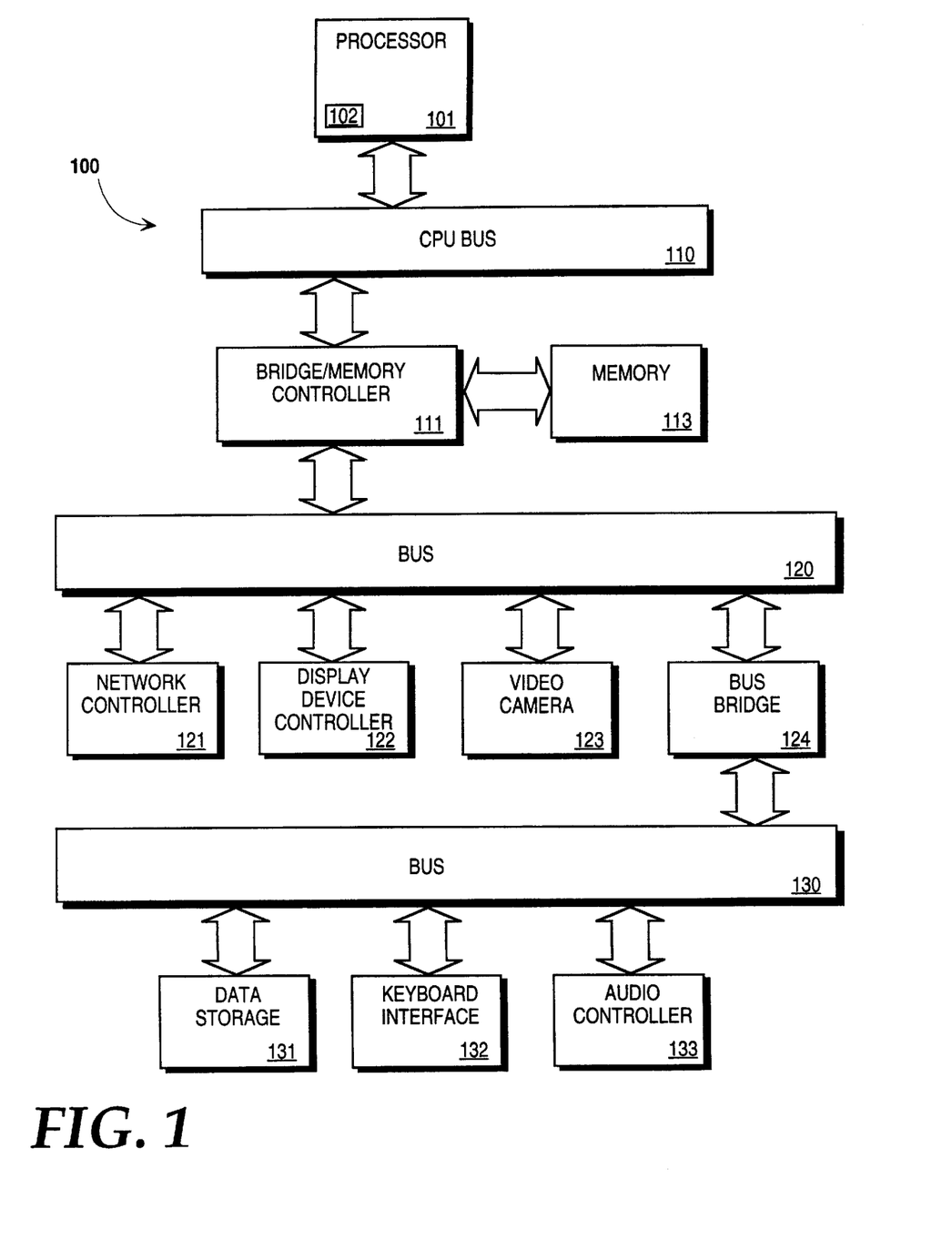
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a static random access memory (SRAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first 10 bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first 10 bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120. The video camera 120 operates to capture an image of an object. The video camera 123 may be a digital video camera having internal digital video capture hardware that translates the captured image into digital graphical data. The video camera 123 may be an analog video camera having digital video capture hardware external to the video camera 123 for digitizing the captured image.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

The present invention is related to the use of the computer system 100 to manage data from a video sequence. According to one embodiment, managing data from a video sequence is performed by the computer system 100 in response to the processor 101 executing sequences of instructions in main memory 113. Such instructions may be read into memory 113 from another computer-readable medium, such as data storage device 131, or from another source via the network controller 121. Execution of the sequences of instructions causes the processor 101 to manage data from a video sequence, as will be described hereafter. In an alternative embodiment, hardwired circuitry may be used in place of or in combination with software instructions to implement the present invention. Thus, the present invention is not limited to any specific combination of hardware circuitry and software.

Figure 2:
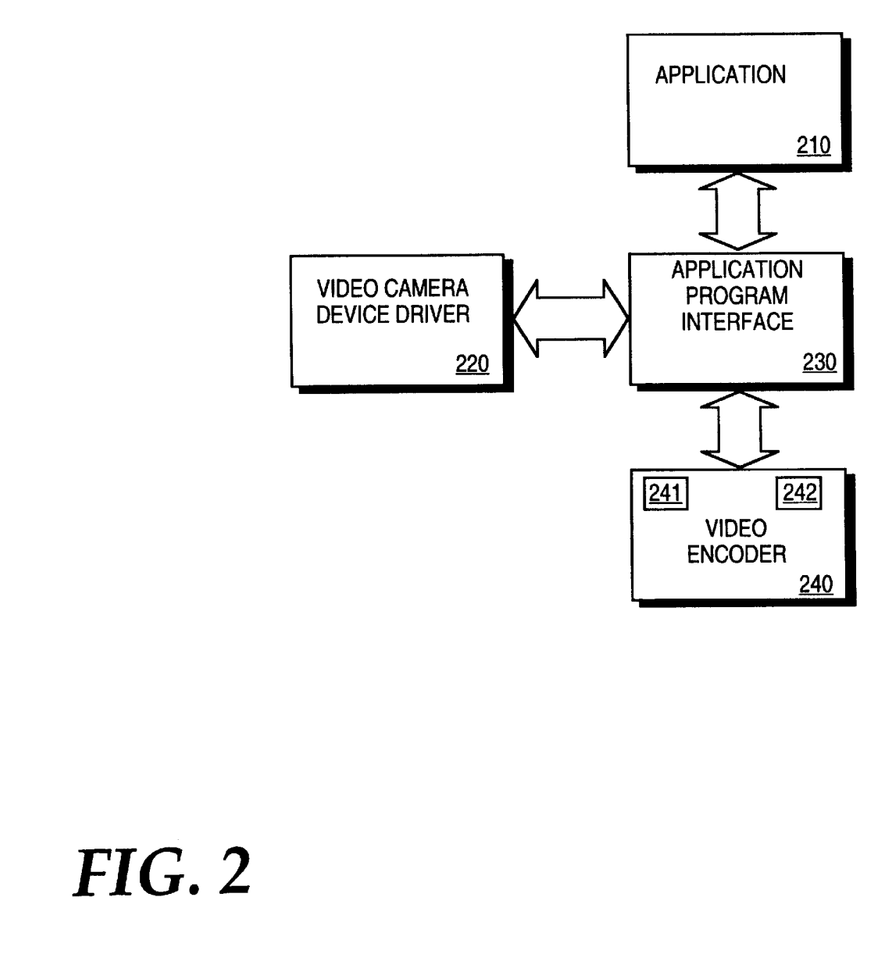
FIG. 2 is a block diagram illustrating modules implementing an embodiment of the present invention.

FIG. 2 is a block diagram illustrating modules implementing an embodiment of the present invention. According to a preferred embodiment of the present invention, the modules are implemented by sequences of instructions in the main memory 113 (shown in FIG. 1). It should be appreciated that some of the modules may also be implemented by hardware as components coupled to the bus 120 (shown in FIG. 1) or a combination of both hardware and software.

Block 210 represents a video authoring application. The video authoring application 210 operates to manage the capturing, editing, encoding, and storage of a video sequence. According to an embodiment of the video management application 210, the video management application 210 provides a graphical user interface to a user to allow the user to specify editing and encoding parameters. The editing and encoding parameters may include a bit rate in which the video sequence is to be transmitted, how often a key frame is generated, a quality value which a video encoder is to encode the video sequence, or other parameters.

Block 220 represents a video camera device driver. The video camera device driver 220 operates to allow the video management application 210 to communicate with the video camera 123 (shown in FIG. 1). According to an embodiment of the video camera device driver 220, the video camera device driver 220 receives a video sequence from digital video capture hardware residing inside the video camera 123.

Block 230 represents an application program interface 230. The application program interface 230 is coupled to the video management application 210 and the video camera device driver 220. The application program interface operates to translate instructions between the video management application 210, the video camera device driver 220, and a video encoder. The application program interface 230 facilitates communication between applications, video camera device drivers, and video encoders that may be written with different code. According to an embodiment of the present invention, the application program interface 230 is a Video for Windows® application program interface that does not provide the video encoder with a captured frame rate.

Block 240 represents a video encoder. The video encoder 240 is coupled to the application program interface 230. The video encoder 240 includes a coding manager 241 and a video coding unit 242. The coding manager 241 operates to calculate a bit allocation number that determines the number of bits to be used to encode frames in the video sequence. The coding manager 241 calculates the bit allocation number using a real-time clock to record the time of instructions received from the application program interface 230. The video coding unit 242 is coupled to the coding manager 241. The video coding unit 242 operates to encode frames in a video sequence received from the video camera device driver 220 via the application program interface 230. The video coding unit 242 encodes the frames according to editing and encoding instructions received from the video management application 210 via the application program interface 230. The video coding unit 230 encodes the frames in the video sequence according to the bit allocation number. The video management application 210, video camera device driver 220, application program interface 230, and video encoder 240 may be implemented by any known circuitry or technique.

Figure 3:
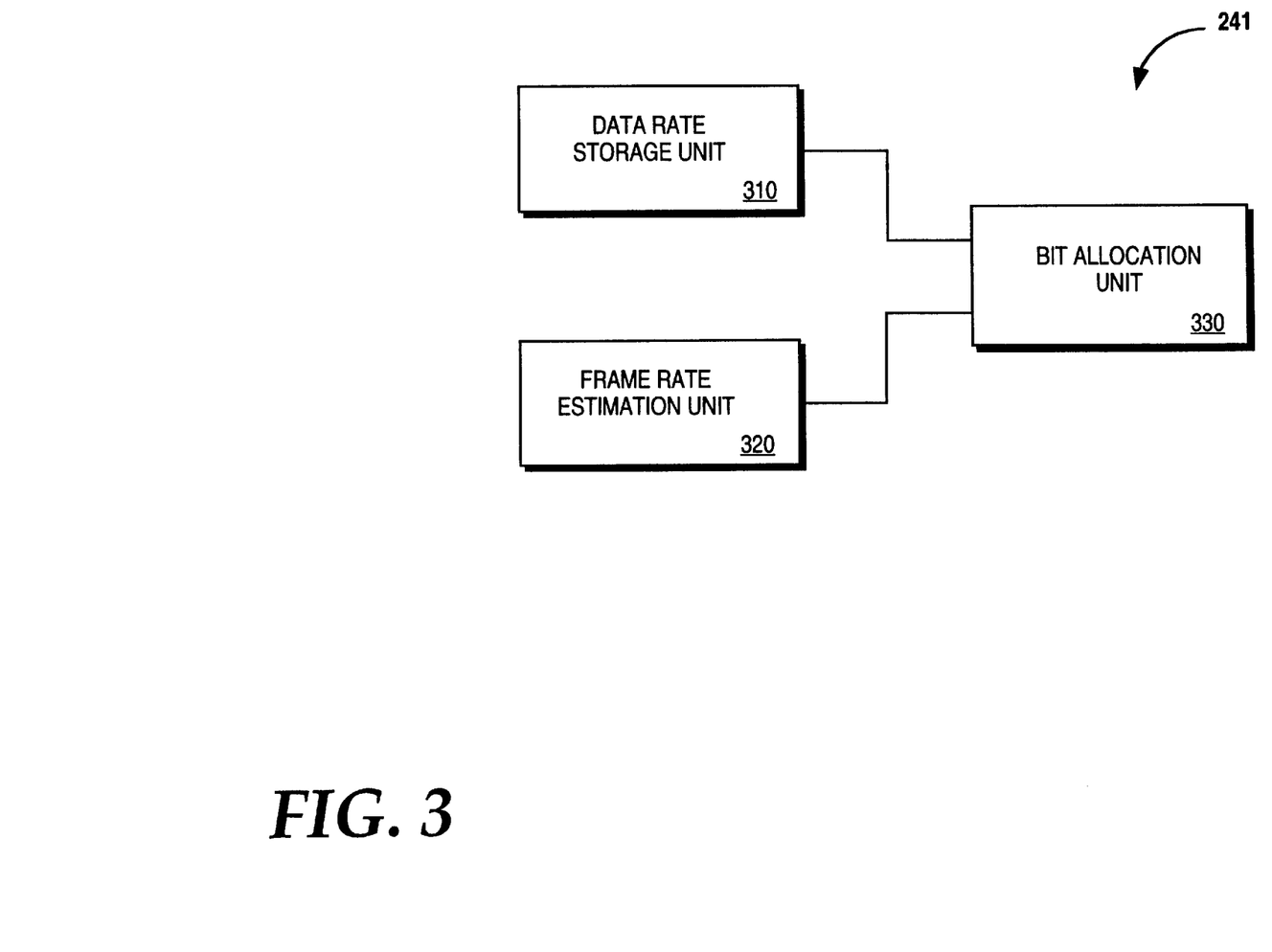
FIG. 3 is a block diagram of a coding manager according to an embodiment of the present invention.

FIG. 3 is a block diagram of modules implementing a coding manager 241 according to an embodiment of the present invention. Block 310 represents a data rate storage unit. The data rate storage unit 310 operates to store a data rate in which frames in a video sequence are required to be transmitted. According to an embodiment of the present invention, the data rate storage unit 310 stores a data rate value received from a video management application 210 (shown in FIG. 2) via an application program interface (shown in FIG. 2).

Block 320 represents a frame rate estimation unit. The frame rate estimation unit 320 operates to estimate a frame rate of the video sequence from the timing of instructions sent to the video encoder 240 (shown in FIG. 2) from the video management application via the application program interface 230 (shown in FIG. 2). According to an embodiment of the present invention, the frame rate estimation unit 320 estimates a frame rate of a video sequence from the timing of function calls to compress data in a frame. It should be appreciated that the frame rate estimation unit 320 may estimate the frame rate of the video sequence from the timing of other instructions sent to the video encoder 240 (shown in FIG. 2 from the video management application).

Block 330 represents a bit allocation unit. The bit allocation unit 330 is coupled to the data rate storage unit 310 and the frame rate estimation unit 320. The bit allocation unit 330 operates to calculate a bit allocation number based on the data rate value and the frame rate. According to an embodiment of the bit allocation unit 330, the bit allocation unit calculates the bit allocation number by dividing the data rate value by the frame rate.

The data rate storage unit 310, the frame rate estimation unit 320, and the bit allocation unit 330 may be implemented by any known circuitry or technique. According to an embodiment of the present invention where the coding manager 241 is implemented in hardware, the data rate storage unit 310, the frame rate estimation unit 320, and the bit allocation unit 330 all reside on a same silicon substrate.

Figure 4:
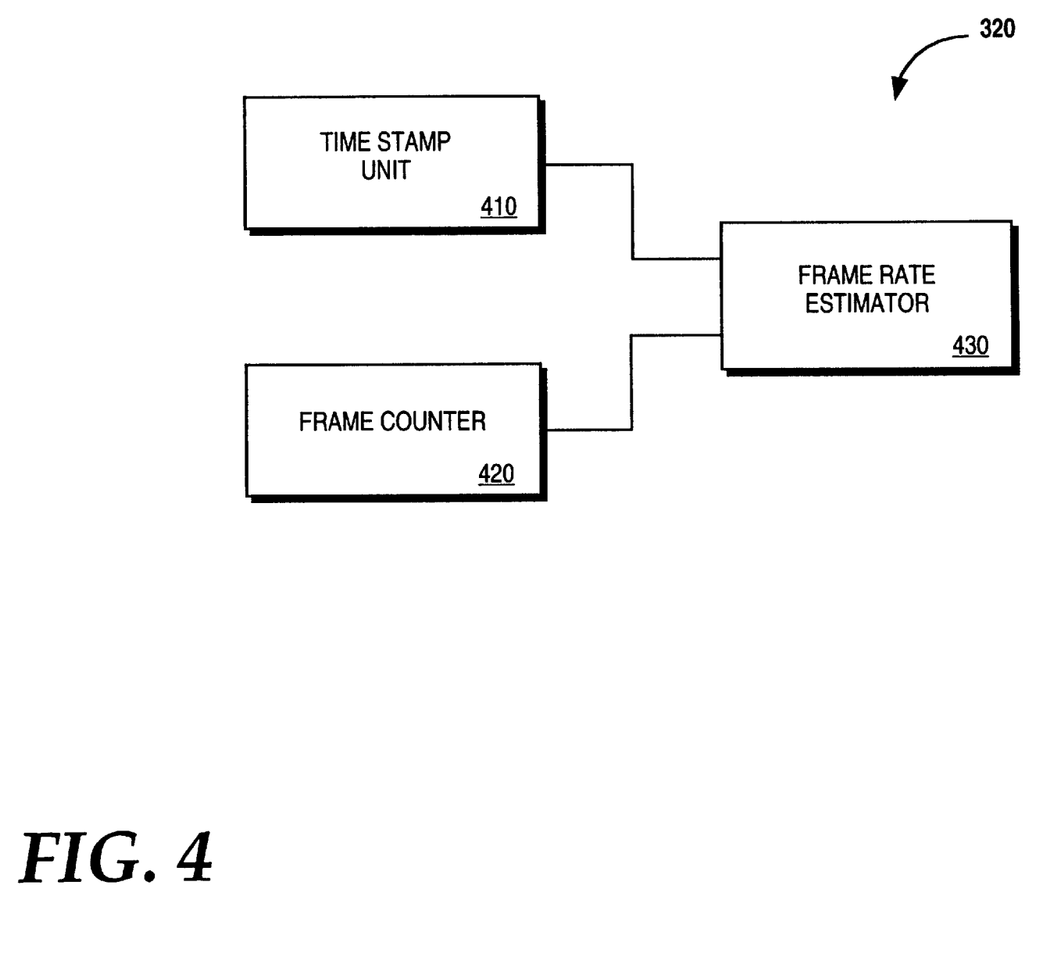
FIG. 4 is a block diagram of a frame rate estimation unit according to an embodiment of the present invention.

FIG. 4 is a block diagram illustrating modules implementing a frame rate estimation unit 320 according to an embodiment of the present invention. Block 410 represents a time stamp unit. The time stamp unit 410 operates to record the real-time when the first function call is made to compress data corresponding to the first frame in the video sequence from the application program interface 230 (shown in FIG. 2). The time stamp unit 410 also operates to record the time when each function call is made to compress data corresponding to subsequent frames in the video sequence from the application program interface 210. The compress function calls are made by the application program interface 230 in response to instructions from the video management application 210 (shown in FIG. 2) to encode the video frames.

Block 420 represents a frame counter 420. The frame counter 420 operates to record a number of frames that have been called to be compressed after the first frame.

Block 430 represents a frame rate estimator 430. The frame rate estimator is coupled to the time stamp unit 410 and the frame counter 420. The frame rate estimator 430 operates to estimate the frame rate by dividing the number of frames that have been called to be compressed after the first frame by the time elapsed from the first function call and the last compress function call. It should be appreciated that the time stamp unit 410 may be configured to store any number of times, that the frame counter 420 may be configured to record any number of frames, and that the frame rate estimator 430 may estimate a frame rate by dividing any number of frames that have been called to be compressed after the first frame by a time elapsed between any number of function calls. According to an embodiment of the present invention, the frame rate estimator 430 outputs a predefined value as an initial estimation of a frame rate when the frame rate estimator 430 does not have sufficient data to estimate a frame rate. This situation occurs, for example, when there is only one function call recorded.

The estimated frame rate is used to perform data rate control on the video sequence. The estimation is performed by calculating the ratio between the number of encoded frames and the elapsed time between the frame currently being encoded and the first frame in a moving average of frames. Together with the requested data rate, the frame rate is used to calculate the bit allocation for each frame using the relationship:

$$BPF=BPS/FPS.$$

BPS (bits-per-second) is the requested data rate. FPS (frames-per-second) is the estimated frame rate. BPF (bits-per-frame) is the bit allocation for each frame. The video encoder 240 (shown in FIG. 2) uses this bits-per-frame allocation to limit the compressed size of each frame to achieve the desired data rate. In the past, data rate transmission for video sequences was not controllable in Video for Windows® during real-time capture and compression. This was a problem when video sequences had to be transmitted over a band-limited channel for real-time applications. The present invention allows a desired data rate to be achieved to meet real-time bandwidth constraints when the frame rate is not explicitly provided.

The present invention allows the video encoder 240 (shown in FIG. 2) to dynamically adjust the bit allocation for each frame according to a current frame rate received from a video camera device driver 220 (shown in FIG. 2). In real-time environments, the frame rate is often non-deterministic. Fluctuations in a system load on the computer system 100 (shown in FIG. 1) may temporarily increase or decrease the video capture frame rate. Thus, if a frame rate decreases temporarily, the video encoder 240 recognizes that it may increase the number of bits to allocate for encoding a frame in the video sequence without exceeding the desired data rate. By increasing the number of bits to allocate to encoding frames, the video encoder 240 improves the visual quality of each frame. Similarly, if a frame rate increases temporarily, the video encoder 240 recognizes that it must decrease the number of bits to allocate for encoding a frame in the video sequence in order to meet the desired data rate.

The time stamp unit 410, the frame counter 420, and the frame rate estimator 430 may be implemented by any known circuitry or any known technique. According to an embodiment of the present invention where the frame rate estimation unit 320 is implemented by hardware, the time stamp unit 410, the frame counter 420, and the frame rate estimator 430 all reside on a same silicon substrate.

Figure 5:
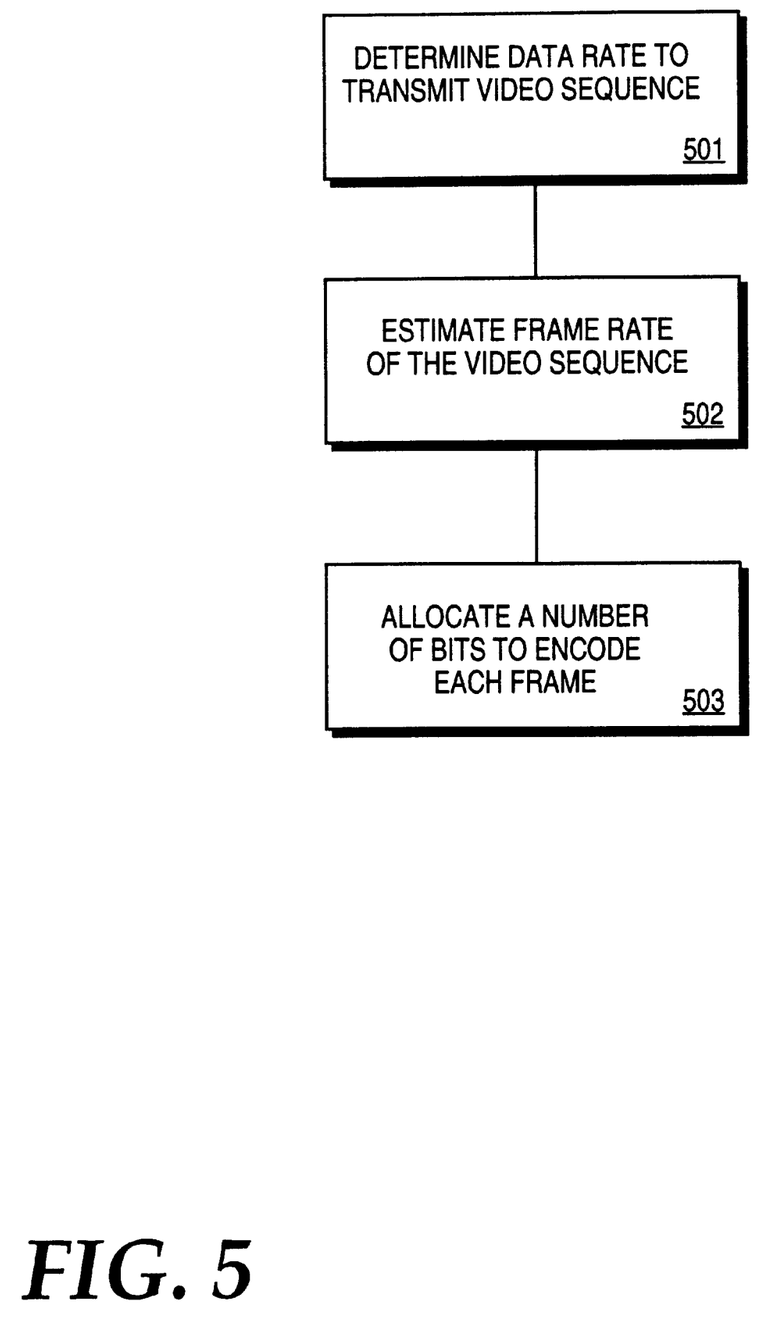
FIG. 5 is a flow chart illustrating a method for managing data in a video sequence according to an embodiment of the present invention.

FIG. 5 is a flow chart illustrating a method for managing data in a video sequence according to an embodiment of the present invention. At step 501, a data rate in which the video sequence is to be transmitted is determined. According to a first embodiment of the present invention, the data rate is determined from user input. According to a second embodiment of the present invention, the data rate is determined by accessing bandwidth parameters for a transmission medium which is to be used to transmit the video sequence.

At step 502, a frame rate of the video sequence is estimated using information from an application program interface. According to an embodiment of the present invention, estimating the frame rate is described in a flow chart illustrated in FIG. 6.

At step 503, a number of bits for encoding frames in the video sequence is allocated according to a data rate and the frame rate. By dynamically determining a bit allocation number according to a present frame rate of the video sequence, the present invention is able to meet the specified data rate during any temporary increases in frame rate during system load fluctuation. Likewise, the present invention is able to take advantage of additional bandwidth made available during temporary decreases in frame rate during system load fluctuation by allocating a larger number of bits to encode the frames in the video sequence, improving the visual quality of each frame. According to an embodiment of the present invention, allocating the number of bits for encoding the frames in the video sequence comprises dividing the data rate by the frame rate.

Figure 6:
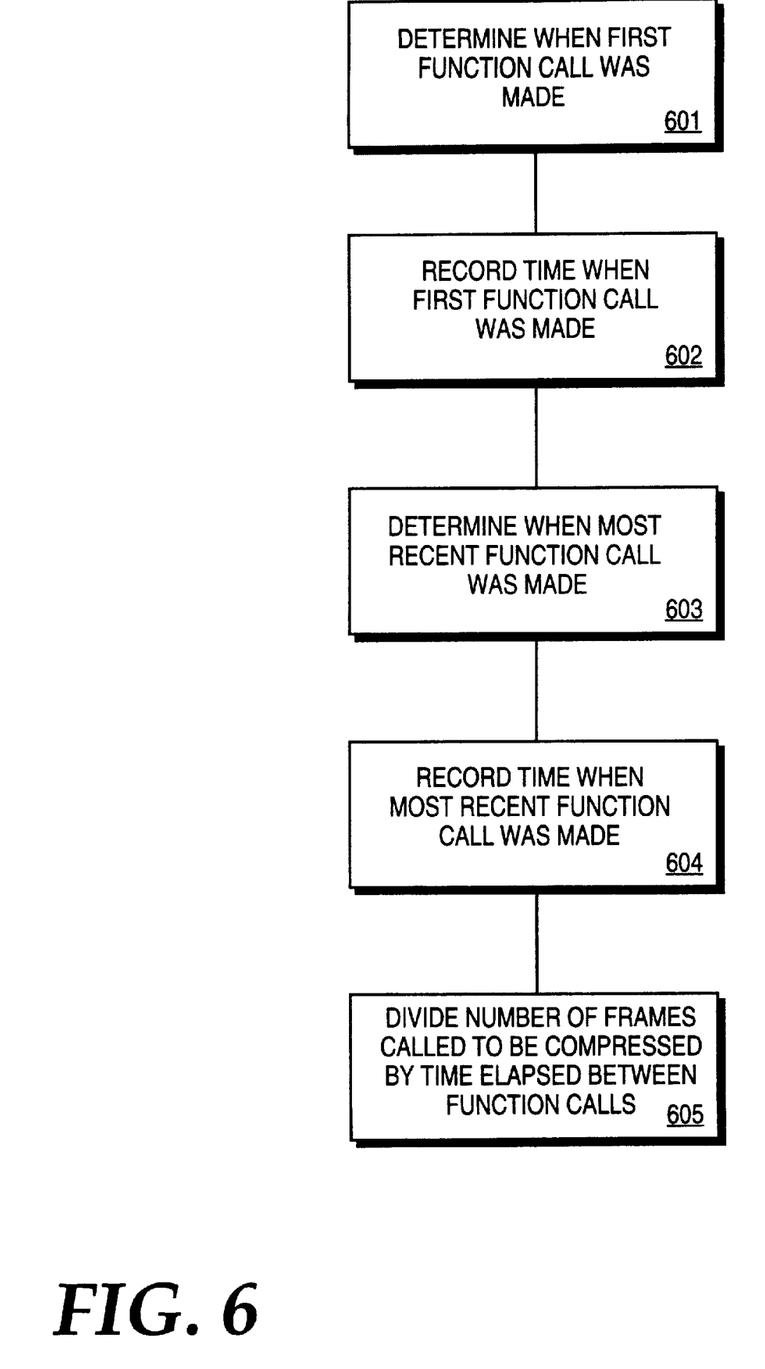
FIG. 6 is a flow chart illustrating a method for estimating a frame rate in a video sequence according to an embodiment of the present invention

FIG. 6 is a flow chart illustrating a method for estimating a frame rate of a video sequence according to an embodiment of the present invention. At step 601, it is determined when a first function call is made to compress data corresponding to a first frame in the video sequence from the application program interface.

At step 602, a time when the first function call was made is recorded or time stamped.

At step 603, it is determined when the most recent function call is made to compress data corresponding to the most recent frame in the video sequence from the application program interface.

At step 604, a time when the most recent function call was made is recorded or time stamped.

At step 605, a number of frames that have been called to be compressed after the first frame is divided by the time elapsed between when the first function call and the current function call is made.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A method for managing data in a video sequence, comprising:

estimating a frame rate of the video sequence using time stamps of instructions received from an application program interface, the time stamps being real-time representations of when the instructions are received from the application program interface; and allocating a number of bits for encoding frames in the video sequence based on a data rate and the frame rate.

2. The method of claim 1, wherein estimating the frame rate of the video sequence comprises:

determining when a first function call is made to compress data corresponding to a first frame in the video sequence from the application program interface;

recording a time when the first function call was made;

determining when a second function call is made to compress data corresponding to a second frame in the video sequence from the application program interface;

recording a time when the second function call was made; and dividing a number of frames that have been called to be compressed after the first frame by a time elapsed between when the first function call and the second function call were made.

3. The method of claim 1, wherein allocating the number of bits for encoding the frames in the video sequence comprises dividing the data rate by the frame rate.

4. The method of claim 1, further comprising:

determining a data rate from user input.

5. The method of claim 1, wherein the managing of the graphical data is performed in real-time in a Video for Windows® compliant video encoder.

6. A computer-readable medium having stored thereon sequences of instructions, the sequences of instructions including instructions which, when executed by a processor, causes the processor to perform:

estimating a frame rate of a video sequence using time stamps of instructions received from an application program interface, the time stamps being real-time representations of when the instructions are received from the application program interface; and allocating a number of bits for encoding frames in the video sequence based on a data rate and the frame rate.

7. The computer-readable medium of claim 6, wherein estimating the frame rate of the video sequence comprises:

determining when a first function call is made to compress data corresponding to a first frame in the video sequence from the application program interface;

recording a time when the first function call was made;

determining when a second function call is made to compress data corresponding to a second frame in the video sequence from the application program interface;

recording a time when the second function call was made; and dividing a number of frames that have been called to be compressed after the first frame a time elapsed between when the first function call and the second function call were made.

8. The computer-readable medium of claim 6, wherein allocating the number of bits for encoding the frames in the video sequence comprises dividing the data rate by the frame rate.

9. The computer-readable medium of claim 6 further comprising instructions which, when executed by the processor, causes the processor to perform:

determining a data rate from user input.

10. The computer-readable medium of claim 6, wherein the managing of the graphical data is performed in real-time in a Video for Windows® compliant video encoder.

11. A video encoder, comprising:

a coding manager that calculates a bit allocation number to encode frames in a video sequence using time stamps of instructions received from an application program interface, the time stamps being real-time representations of when the instructions are received from the application program interface; and a video coding unit coupled to the coding manager that encodes the frames in the video sequence based on the bit allocation number.

12. The video encoder of claim 11, wherein the coding manager comprises:

a data rate storage unit that stores a data rate value which the video sequence is to be transmitted;

a frame rate estimating unit that estimates a frame rate of the video sequence; and a bit allocation unit coupled to the data rate storage unit and the frame rate estimation unit that calculates the bit allocation number based on the data rate value and the frame rate.

13. The video encoder of claim 12, wherein the frame rate estimating unit comprises:

a time stamp unit that records a first time when a first function call is made to compress data corresponding a first frame in the video sequence from the application program interface and a second time when a second function call is made to compress data corresponding to a second frame in the video sequence from the application program interface;

a frame counter that records a number of frames that have been called to be compressed after the first frame; and a frame rate estimator coupled to the time stamp unit and the frame counter that estimates the frame rate by dividing the number of frames that have been called to be compressed after the first frame by a time elapsed between when the first function call and the second function call were made with.

14. The video encoder of claim 12, wherein the bit allocation unit calculates the bit allocation number by dividing the data rate value by the frame rate.

15. A computer system, comprising:

a bus;

a processor coupled to the bus; and a video encoder that includes a coding manager that calculates a bit allocation number to encode frames in a video sequence using time stamps of instructions received from an application program interface and a video coding unit coupled to the coding manager that encodes the frames in the video sequence according to the bit allocation number, and wherein the time stamps being real-time representations of when the instructions are received from the application program interface.

16. The computer system of claim 15, wherein the coding manager comprises:

a data rate storage unit that stores a data rate value which the video sequence is to be transmitted;

a frame rate estimating unit that estimates a frame rate of the video sequence; and a bit allocation unit coupled to the data rate storage unit and the frame rate estimation unit that calculates the bit allocation number based on the data rate value and the frame rate.

17. The computer system of claim 16, wherein the frame rate estimating unit comprises:

a time stamp unit that records a first time when a first function call is made to compress data corresponding a first frame in the video sequence from the application program interface and a second time when a second function call is made to compress data corresponding to a second frame in the video sequence from the application program interface;

a frame counter that records a number of frames that have been called to be compressed after the first frame; and a frame rate estimator coupled to the time stamp unit and the frame counter that estimates the frame rate by dividing the number of frames that have been called to be compressed after the first frame by a time elapsed between when the first function call and the second function call were made.

18. The computer system of claim 15, wherein the bit allocation unit calculates the bit allocation number by dividing the data rate value by the frame rate.

19. A method for managing data in a video sequence, comprising:

estimating a frame rate of the video sequence using time stamps of instructions received from an application program interface, and wherein estimating the frame rate of the video sequence including:

determining when a first function call is made to compress data corresponding to a first frame in the video sequence from the application program interface, recording a time when the first function call was made;

determining when a second function call is made to compress data corresponding to a second frame in the video sequence from the application program interface, recording a time when the second function call was made, and dividing a number of frames that have been called to be compressed after the first frame by a time elapsed between when the first function call and the second function call were made; and allocating a number of bits for encoding frames in the video sequence based on a data rate and the frame rate.

20. A computer-readable medium having stored thereon sequences of instructions, the sequences of instructions including instructions which, when executed by a processor, causes the processor to perform:

estimating a frame rate of a video sequence using time stamps of instructions received from an application program interface, and wherein estimating the frame rate of the video sequence including:

determining when a first function call is made to compress data corresponding to a first frame in the video sequence from the application program interface, recording a time when the first function call was made, determining when a second function call is made to compress data corresponding to a second frame in the video sequence from the application program interface, recording a time when the second function call was made, and dividing a number of frames that have been called to be compressed after the first frame a time elapsed between when the first function call and the second function call were made; and allocating a number of bits for encoding frames in the video sequence based on a data rate and the frame rate.

21. A video encoder, comprising:

a coding manager that calculates a bit allocation number to encode frames in a video sequence using of instructions received from an application program interface, the coding manager including:
- a data rate storage unit that stores a data rate value which the video sequence is to be transmitted,
- a frame rate estimating unit that estimates a frame rate of the video sequence, the frame estimating unit including:
  - a time stamp unit that records a first time when a first function call is made to compress data corresponding a first frame in the video sequence from the application program interface and a second time when a second function call is made to compress data corresponding to a second frame in the video sequence from the application program interface,
  - a frame counter that records a number of frames that have been called to be compressed after the first frame, and
  - a frame rate estimator coupled to the time stamp unit and the frame counter that estimates the frame rate by dividing the number of frames that have been called to be compressed after the first frame by a time elapsed between when the first function call and the second function call were made with, and
- a bit allocation unit coupled to the data rate storage unit and the frame rate estimation unit that calculates the bit allocation number based on the data rate value and the frame rate; and a video coding unit coupled to the coding manager that encodes the frames in the video sequence based on the bit allocation number.

22. A computer system, comprising:

a bus;

a processor coupled to the bus; and a video encoder that includes a coding manager that calculates a bit allocation number to encode frames in a video sequence using of instructions received from an application program interface and a video coding unit coupled to the coding manager that encodes the frames in the video sequence based on the bit allocation number, the coding manager including:
- a data rate storage unit that stores a data rate value which the video sequence is to be transmitted,
- a frame rate estimating unit that estimates a frame rate of the video sequence, the frame rate estimating unit including:
  - a time stamp unit that records a first time when a first function call is made to compress data corresponding a first frame in the video sequence from the application program interface and a second time when a second function call is made to compress data corresponding to a second frame in the video sequence from the application program interface,
  - a frame counter that records a number of frames that have been called to be compressed after the first frame, and
  - a frame rate estimator, coupled to the time stamp unit and the frame counter, that estimates the frame rate by dividing the number of frames that have been called to be compressed after the first frame by a time elapsed between when the first function call and the second function call were made, and
- a bit allocation unit coupled to the data rate storage unit and the frame rate estimation unit that calculates the bit allocation number based on the data rate value and the frame rate.

* * * * *

UNITED STATES PATENT AND TRADEMARK OFFICE
CERTIFICATE OF CORRECTION

PATENT NO. : 6,108,447  
APPLICATION NO. : 09/049287  
DATED : August 22, 2000  
INVENTOR(S) : Lord et al.

It is certified that error appears in the above-identified patent and that said Letters Patent is hereby corrected as shown below:

In column 2, at line 54, delete "10" and insert –I/O--.

Signed and Sealed this

Eighth Day of August, 2006

JON W. DUDAS  
*Director of the United States Patent and Trademark Office*